(12) United States Patent
 Thebault

(10) Patent No.: US 11,155,158 B2
(45) Date of Patent: Oct. 26, 2021

(54) VENTILATION FLOW RATE REGULATOR FOR A PRESSURISED TANK OF A VEHICLE

(71) Applicant: Plastic Omnium Advanced Innovation and Research, Brussels (BE)

(72) Inventor: Remi Thebault, Catenoy (FR)

(73) Assignee: Plastic Omnium Advanced Innovation and Research, Brussels (BE)

(*) Notice: Subject to any disclaimer, the term of this patent is extended or adjusted under 35 U.S.C. 154(b) by 82 days.

(21) Appl. No.: 16/321,519

(22) PCT Filed: Jul. 25, 2017

(86) PCT No.: PCT/EP2017/068704
 § 371 (c)(1),
 (2) Date: Jan. 29, 2019

(87) PCT Pub. No.: WO2018/019801
 PCT Pub. Date: Feb. 1, 2018

(65) Prior Publication Data
 US 2019/0168607 A1   Jun. 6, 2019

(30) Foreign Application Priority Data

Jul. 29, 2016 (FR) .................................... 1657419
 Aug. 29, 2016 (FR) .................................... 1658011

(51) Int. Cl.
 *B60K 15/035* (2006.01)
 *F02M 25/08* (2006.01)
 (Continued)

(52) U.S. Cl.
 CPC .. *B60K 15/03504* (2013.01); *B60K 15/03519* (2013.01); *F02M 25/089* (2013.01);
 (Continued)

(58) Field of Classification Search
 CPC ....... Y10T 137/7847; Y10T 137/87917; Y10T 137/86928; Y10T 137/7838;
 (Continued)

(56) References Cited

U.S. PATENT DOCUMENTS 2,342,347 A * 2/1944 Jacobsen ........................ 222/490
2,381,544 A * 8/1945 Jacobsen ........................ 251/331
(Continued)

FOREIGN PATENT DOCUMENTS

DE   102011106008 A1   1/2013
WO   WO 2015/095516 A2   6/2015

OTHER PUBLICATIONS

International Search Report dated Sep. 19, 2017, in PCT/EP2017/068704, filed Jul. 25, 2017.

*Primary Examiner* — Michael R Reid
*Assistant Examiner* — Frederick D Soski
(74) *Attorney, Agent, or Firm* — Oblon, McClelland, Maier & Neustadt, L.L.P.

(57) ABSTRACT

A ventilation flow rate regulator for a pressurised tank of a vehicle. The regulator includes a body including a gas inlet and a gas outlet, and at least one restrictor mounted movably relative to the body. The restrictor is mounted to reduce a cross-section of at least one path of a gas flow proceeding from the inlet to the outlet, when a flow rate at the inlet is greater than a predetermined threshold. The regulator is arranged so that the cross-section remains non-zero irrespective of a flow rate.

13 Claims, 6 Drawing Sheets

(51) Int. Cl.
| | |
|---|---|
| *F16K 24/04* | (2006.01) |
| *G05D 7/01* | (2006.01) |
| *F16K 17/28* | (2006.01) |
| *F16K 15/02* | (2006.01) |
| *F16K 15/03* | (2006.01) |
| *F16K 17/30* | (2006.01) |
| *F16K 24/00* | (2006.01) |
| *F16K 15/14* | (2006.01) |
| *G05D 16/04* | (2006.01) |
| *F16K 17/34* | (2006.01) |
| *G05D 16/06* | (2006.01) |
| *F16K 21/02* | (2006.01) |
| *F02D 41/00* | (2006.01) |
| *B60K 15/03* | (2006.01) |

(52) U.S. Cl.
CPC ....... *F02M 25/0836* (2013.01); *F16K 15/026* (2013.01); *F16K 15/031* (2013.01); *F16K 15/035* (2013.01); *F16K 15/144* (2013.01); *F16K 17/28* (2013.01); *F16K 17/30* (2013.01); *F16K 17/34* (2013.01); *F16K 21/02* (2013.01); *F16K 24/00* (2013.01); *F16K 24/04* (2013.01); *G05D 7/012* (2013.01); *G05D 7/014* (2013.01); *G05D 7/0173* (2013.01); *G05D 16/0402* (2019.01); *G05D 16/0641* (2013.01); *B60K 2015/03269* (2013.01); *B60K 2015/03514* (2013.01); *B60K 2015/03561* (2013.01); *F02D 41/003* (2013.01); *Y10T 137/7838* (2015.04)

(58) Field of Classification Search
CPC ......... Y10T 137/7842; Y10T 137/7879; Y10T 137/7885; Y10T 137/7888; Y10T 137/7891; Y10T 137/7908; Y10T 137/7921; Y10T 137/7922; Y10T 137/0874; Y10T 137/86524; Y10T 137/86759; Y10T 137/86815; Y10T 137/8733; Y10T 137/87338; Y10T 137/87555; Y10T 137/87571; Y10T 137/87273; Y10T 137/88054; B60K 15/03504; B60K 15/03519; B60K 2015/03269; B60K 2015/03514; B60K 2015/03561; G05D 16/0404; G05D 7/012; G05D 7/014; G05D 7/0173; G05D 16/0641; F02M 25/0836; F02M 25/089; F04D 41/003; F16K 15/031; F16K 15/026; F16K 15/035; F16K 15/144; F16K 17/28; F16K 17/30; F16K 17/34; F16K 21/02; F16K 24/04
USPC .............................. 251/331, 37, 118; 138/40
See application file for complete search history.

(56) References Cited

U.S. PATENT DOCUMENTS

| | | | | | |
|---|---|---|---|---|---|
| 2,593,315 | A * | 4/1952 | Kraft | ........................ | G05D 7/012 138/45 |
| 2,631,604 | A * | 3/1953 | Born | ........................ | F16K 17/00 137/466 |
| 2,674,318 | A * | 4/1954 | Sutliff | ........................ | E21B 27/00 166/165 |
| 3,047,013 | A * | 7/1962 | Baumbach | ........................ | E03D 11/00 137/849 |
| 3,319,560 | A * | 5/1967 | Schaaf | ........................ | B60H 1/3442 454/154 |
| 3,565,106 | A * | 2/1971 | Baumbach | ........................ | E03C 1/298 137/513.3 |
| 3,589,392 | A * | 6/1971 | Meyer | ........................ | A61F 2/2412 137/846 |
| 3,622,082 | A * | 11/1971 | Tyre | ........................ | F16K 24/04 239/533.14 |
| 3,837,358 | A * | 9/1974 | Zieg | ........................ | E03C 1/108 137/614.2 |
| 3,865,137 | A * | 2/1975 | Chvatal | ........................ | G05D 16/0655 137/613 |
| 3,895,646 | A * | 7/1975 | Howat | ........................ | F16K 17/38 137/468 |
| 4,098,287 | A * | 7/1978 | Baumbach | ........................ | E03F 5/042 137/362 |
| 4,142,544 | A * | 3/1979 | Straub | ........................ | F16K 17/20 137/460 |
| 4,308,885 | A * | 1/1982 | Geisseler | ........................ | F16K 15/147 137/460 |
| 4,465,102 | A * | 8/1984 | Rupp | ........................ | F16K 15/147 137/512.4 |
| 4,660,598 | A * | 4/1987 | Butterfield | ........................ | F16K 7/14 137/510 |
| 4,717,117 | A * | 1/1988 | Cook | ........................ | B60G 17/0528 251/331 |
| 5,116,564 | A * | 5/1992 | Jansen | ........................ | A61F 2/2412 156/308.2 |
| 5,467,960 | A * | 11/1995 | Morris | ........................ | B60H 1/00485 251/30.01 |
| 5,529,280 | A * | 6/1996 | Satoh | ........................ | F16K 7/17 251/331 |
| 5,592,966 | A * | 1/1997 | Gates | ........................ | F16K 15/144 137/513.5 |
| 5,709,309 | A * | 1/1998 | Gallagher | ........................ | B62D 25/24 137/849 |
| 5,730,423 | A * | 3/1998 | Wu | ........................ | F16K 7/14 251/331 |
| 5,762,086 | A * | 6/1998 | Ollivier | ........................ | F16K 31/1225 137/1 |
| 5,779,224 | A * | 7/1998 | Fukano | ........................ | F16K 41/12 251/331 |
| 5,803,121 | A * | 9/1998 | Estes | ........................ | B60R 21/239 137/849 |
| 5,909,747 | A * | 6/1999 | Schieber | ........................ | F16K 7/17 137/492 |
| 5,964,446 | A * | 10/1999 | Walton | ........................ | G05D 16/0633 137/556 |
| 5,971,024 | A * | 10/1999 | Penny | ........................ | F16K 15/144 137/512.15 |
| 6,227,464 | B1 * | 5/2001 | Allmendinger | ........................ | B05B 1/3006 239/525 |
| 6,446,616 | B1 * | 9/2002 | Kabat | ........................ | F02M 21/0242 123/527 |
| 6,752,170 | B2 * | 6/2004 | Muramatsu | ........................ | F02M 69/54 123/459 |
| 6,918,526 | B1 * | 7/2005 | Huang | ........................ | B25C 1/047 137/849 |
| 7,037,303 | B2 * | 5/2006 | Beaufore | ........................ | A61F 2/0013 137/849 |
| 7,143,992 | B2 * | 12/2006 | Sassone | ........................ | F16K 31/404 251/127 |
| 7,237,619 | B2 * | 7/2007 | Mehr | ........................ | A62C 31/02 137/849 |
| 7,306,715 | B2 * | 12/2007 | Kato | ........................ | B01D 35/027 210/136 |
| 7,445,028 | B1 * | 11/2008 | Aanonsen | ........................ | F16K 15/147 137/512.4 |
| 8,316,878 | B2 * | 11/2012 | Lodolo | ........................ | F16K 31/385 137/315.05 |
| 8,910,652 | B2 * | 12/2014 | Nemeth | ........................ | B60K 15/035 137/202 |
| 9,046,394 | B2 * | 6/2015 | Zimmerman | ........................ | G01F 15/10 |
| 9,696,732 | B2 * | 7/2017 | Harada | ........................ | B60K 15/03519 |
| 9,920,849 | B2 * | 3/2018 | Gilliland | ........................ | H05K 9/0041 |
| 2001/0054448 | A1 * | 12/2001 | McFarland | ........................ | F16K 15/147 137/849 |
| 2002/0040732 | A1 * | 4/2002 | King, Jr. | ........................ | F16L 41/065 137/318 |

(56) References Cited

U.S. PATENT DOCUMENTS

| | | | |
|---|---|---|---|
| 2003/0209275 A1* | 11/2003 | Tassinari | F01L 3/205 137/855 |
| 2005/0056257 A1* | 3/2005 | Yoshioka | F02M 37/46 123/457 |
| 2005/0109973 A1* | 5/2005 | Glime | F16K 7/16 251/331 |
| 2005/0211944 A1* | 9/2005 | Tutt | F16K 7/14 251/331 |
| 2005/0263195 A1* | 12/2005 | Dahm | E03D 13/00 137/846 |
| 2006/0118189 A1* | 6/2006 | Tekulve | A61M 39/22 137/846 |
| 2006/0118752 A1* | 6/2006 | Tin-Kai | F16K 1/425 251/331 |
| 2006/0175573 A1* | 8/2006 | Ohmi | F16K 51/02 251/331 |
| 2006/0283501 A1* | 12/2006 | Devall | B60K 15/03519 137/43 |
| 2006/0289068 A1* | 12/2006 | Miller, Jr. | F16K 15/026 137/513.3 |
| 2006/0289825 A1* | 12/2006 | Wincek | F16K 7/126 251/331 |
| 2007/0075284 A1* | 4/2007 | Masamura | F16K 41/103 251/63.5 |
| 2007/0120086 A1* | 5/2007 | Yoshino | F16K 7/16 251/331 |
| 2008/0116412 A1* | 5/2008 | Masamura | F16K 41/103 251/331 |
| 2009/0020722 A1* | 1/2009 | Masamura | F16K 31/122 251/331 |
| 2009/0020723 A1* | 1/2009 | Masamura | F16K 7/16 251/331 |
| 2009/0146095 A1* | 6/2009 | Baril | F16K 7/17 251/331 |
| 2010/0051116 A1* | 3/2010 | Martin | F16K 31/402 137/400 |
| 2010/0139625 A1* | 6/2010 | Vulkan | F16K 17/196 123/520 |
| 2010/0319784 A1 | 12/2010 | Kuhne et al. | |
| 2010/0326533 A1* | 12/2010 | Mooney | G05D 16/02 137/12 |
| 2011/0297255 A1* | 12/2011 | Weingarten | F16K 37/0058 137/535 |
| 2011/0315242 A1* | 12/2011 | Kim | G05D 16/0633 137/544 |
| 2012/0152388 A1* | 6/2012 | Stanaland | F16K 15/147 137/843 |
| 2012/0193564 A1* | 8/2012 | Takeuchi | F16K 27/0236 251/331 |
| 2013/0117921 A1* | 5/2013 | Stanaland | F16K 15/147 4/295 |
| 2013/0340890 A1 | 12/2013 | Matsuo et al. | |
| 2014/0137948 A1 | 5/2014 | Hagen | |
| 2015/0096625 A1* | 4/2015 | Mills | F16K 24/042 137/12 |
| 2015/0108386 A1* | 4/2015 | Obara | F16K 7/12 251/331 |
| 2015/0285394 A1 | 10/2015 | Akimoto et al. | |
| 2016/0025238 A1 | 1/2016 | Miura | |
| 2016/0298777 A1 | 10/2016 | Huseyin et al. | |
| 2016/0326990 A1* | 11/2016 | Pursifull | F02M 25/06 |
| 2020/0094672 A1* | 3/2020 | Criel | F02M 25/089 |

* cited by examiner

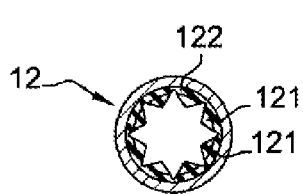
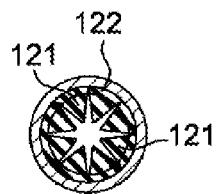
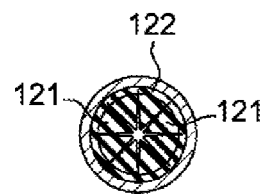
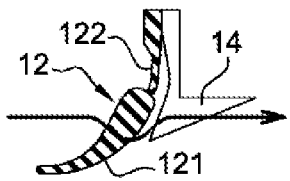
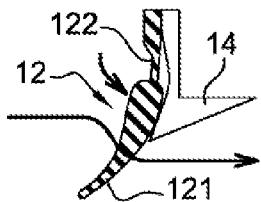
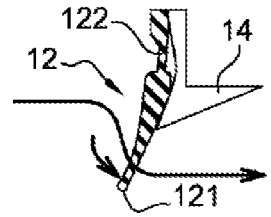
Fig. 7A     Fig. 7B     Fig. 7C
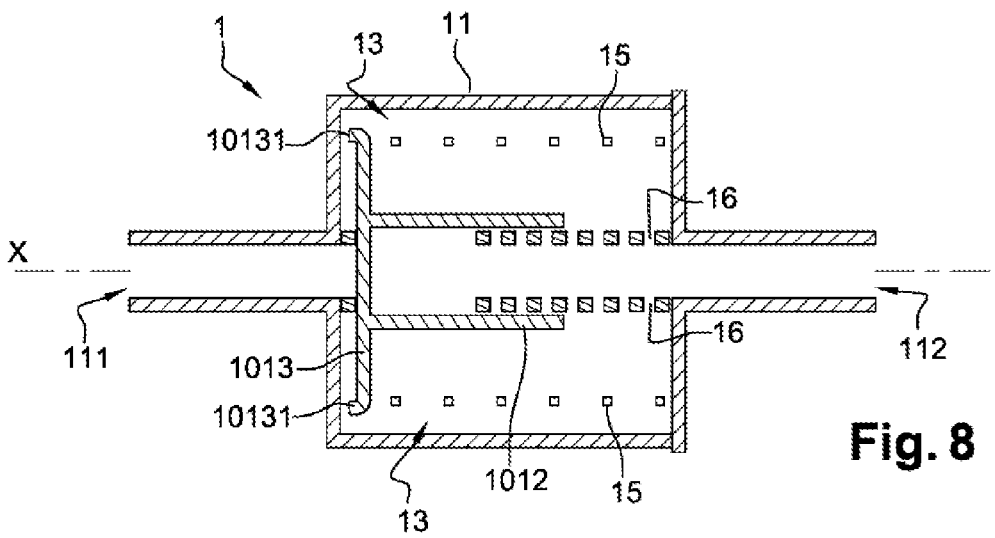
Fig. 8
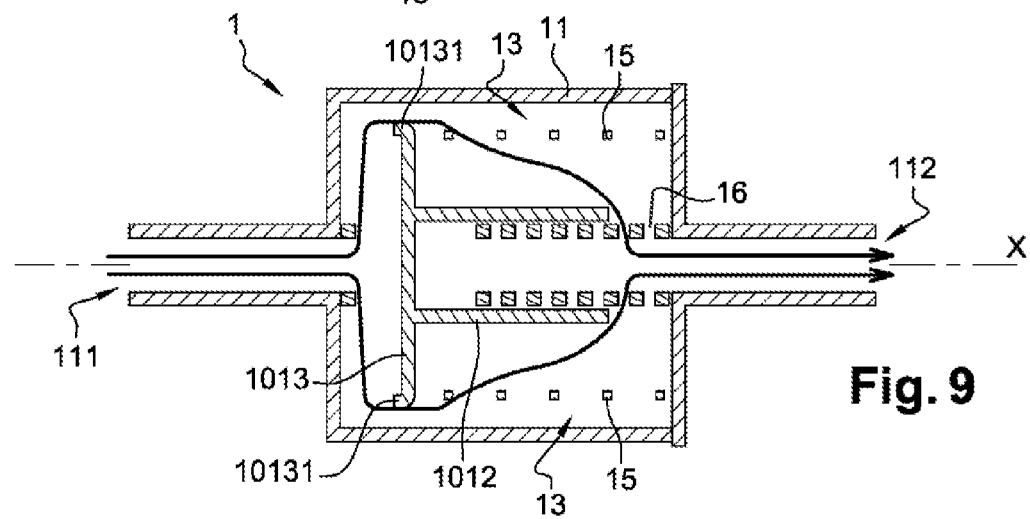
Fig. 9

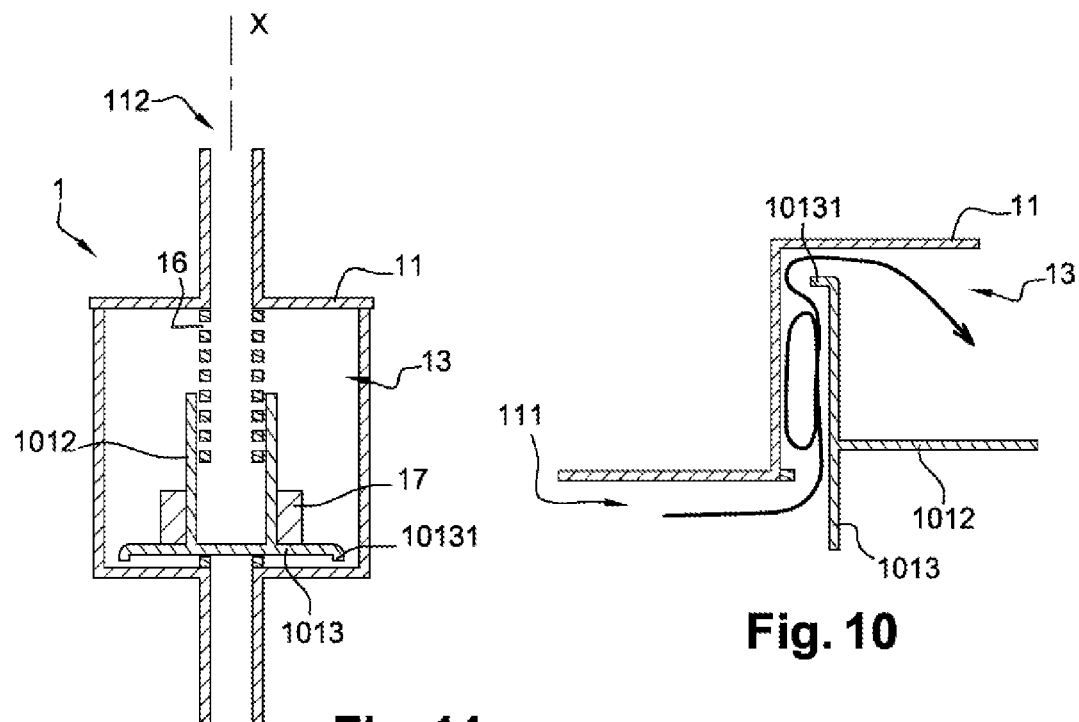
Fig. 11
Fig. 10
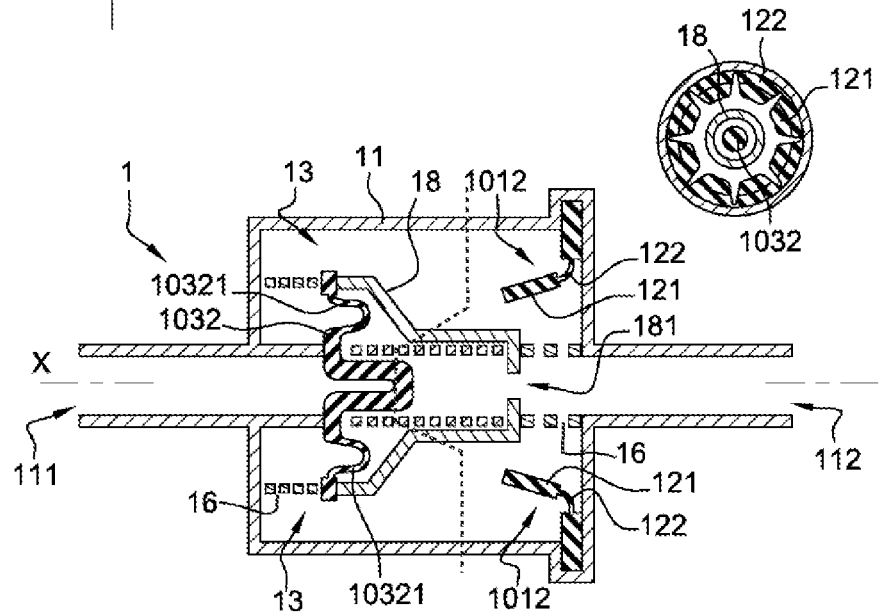
Fig. 12

VENTILATION FLOW RATE REGULATOR FOR A PRESSURISED TANK OF A VEHICLE

BACKGROUND OF THE INVENTION

Field of the Invention

The invention concerns vehicle tanks. More particularly, the invention concerns pressurized vehicle tanks provided with a ventilation system.

Description of the Related Art

The ventilation of pressurized vehicle tanks, such as fuel tanks, is a known issue, the aim of which is to thoroughly ventilate the pressurized tank when certain events take place, in particular in the case of hybrid vehicles, when switching from operation implementing the electric motor to operation implementing the heat engine, or indeed when filling the pressurized tank.

In order to ventilate such tanks, ventilation systems comprising ventilation poppet valves are available commercially as solutions that allow the tank to be ventilated upon the opening of an isolation valve of the tank arranged downstream, within a ventilation line, generally close to the canister. Such ventilation valves can be valves for protection in the event of the vehicle overturning or indeed fill limit valves.

The opening of the isolation valve of the tank, which is controlled electronically, causes the fuel system, which is formed by the inner volume of the tank and by the portion of the inner volume of the ventilation system situated downstream from the isolation valve, to switch from a closed state to an open state. Following this opening, major depressurization of the fuel system is required, characterized by a gas flow flowing at a substantial flow rate from the tank to the canister. There is consequently a risk of plugging by the poppet of the ventilation valve due to the flow rate of the gas flow being too high.

The ventilation poppet can also be held in the closed position upon the opening of the isolation valve, if the movements of the vehicle cause the liquid contained in the tank to surge, for example following sudden braking. Indeed, when the poppet closes during the depressurization of the tank, completely or partially, due to the surge of liquid, the pressure downstream from the tank quickly becomes identical to atmospheric pressure, whereas that inside the tank remains very high (at least higher than the pressure at which the poppet can re-open). This holding of the ventilation poppet in the closed position prevents or greatly impedes the depressurization of the tank to an operating pressure, which is often close to atmospheric pressure.

Therefore, the plugging and the holding of the poppet in the closed position are incompatible with the correct operation of the hybrid vehicle, in which operations of filling the tank or supplying the engine with fuel need to take place swiftly.

One known solution for solving these problems of plugging of the ventilation valve consists of incorporating a ventilation flow rate regulator into the ventilation line, downstream from the ventilation valve. The regulator reduces peripheral access channels available to the gas flow by using a movable member that comes into abutment against a body of the regulator at the outlet of the latter, while maintaining a central access channel by means of the presence of a conduit inside the movable member. However, such a solution does not allow the flow rate of the gas flow to be regulated once the movable member is in abutment against the body of the regulator, preventing optimized performances in terms of ventilating the pressurized tank. Nor does it solve the problem of reopening the poppet, due to the difference in pressure between the pressure downstream from the regulator and its internal pressure. There is no commercially available solution to this problem.

BRIEF SUMMARY OF THE INVENTION

The aim of the invention is to overcome these disadvantages and improve performances in terms of ventilating the pressurized tank.

To this end, according to the invention, a ventilation flow rate regulator is provided for a pressurized tank of a vehicle, which comprises:
  a body having a gas inlet and a gas outlet, and
  at least one restrictor mounted so as to be able to move relative to the body so as to reduce a cross section of at least one path of a gas flow proceeding from the inlet to the outlet, when a flow rate at the inlet is greater than a predetermined threshold,
  the regulator being arranged so that the cross section remains non-zero irrespective of a flow rate.

Therefore, the regulator makes it possible to very finely regulate the flow rate of a gas flow originating from the tank, thus allowing this flow to be ventilated in an optimum manner below the plugging limit of the ventilation valve. Indeed, a ventilation valve provided downstream from the regulator of the invention is capable of ventilating without the risk of plugging by its poppet, for longer and at higher pressures than the same valve not provided with such a regulator within the ventilation line. This ventilation is possible due to a gradual and non-total reduction in a cross section of at least one gas flow path inside the regulator, this reduction being greater than a reduction in a regulator from the prior art, helping ensure optimized ventilation below the plugging limit of the valve, without the risk of the flow rate reaching this limit.

Advantageously, the regulator is arranged so that the cross section remains non-zero irrespective of a position of the restrictor relative to the body.

Therefore, due to its mobility, the restrictor is capable of reducing the cross section of at least one path of the flow without reducing this cross section to zero. For example, for a ventilation flow rate regulator that has peripheral flow paths, the movable restrictor is not sufficiently mobile to close off the paths to the gas flow. In other words, the restrictor is arranged in such a way as to always leave open a passage for the gas flow, even if reduced, regardless of the flow rate of this flow, in a path available inside the regulator.

Advantageously, the restrictor comprises a deformable membrane.

Thus, when a portion of the gas flow passing along the path arrives at the membrane, this portion is deviated due to the presence of the membrane, such a deviation lengthening the journey this portion of the flow must take to the outlet and resulting in a resistance force being applied by the gas flow against the membrane. Consequently, the membrane is deformed and/or moves, which further reduces the cross section of the path in this location. As a result, a greater portion of the flow is in contact with the membrane, which results in an increase in the resistance force of the gas flow, deforming and/or moving the membrane still further, the latter further reducing the cross section of the path until the membrane reaches a configuration and/or position in which it is in dynamic equilibrium. When the gas flow rate reduces, the membrane returns elastically to its initial configuration and/or configuration.

Advantageously, the deformable membrane has a first thickness, at a first cross section of the deformable membrane, and a second thickness, at a second cross section of the deformable membrane, the first thickness and the second thickness being different.

It is therefore possible to arrange the deformable membrane such that it has a thickness that varies in places, such that its deformation and movement are promoted depending on the gas flow. In other words, according to this advantageous embodiment of the invention, the deformable membrane has at least two different thicknesses.

Advantageously, the restrictor comprises at least one thinned portion forming a hinge.

As a result of its hinge, the restrictor can therefore reduce the cross section of a path under the influence of the gas flow, regardless of the deformation of the membrane. This means that the restrictor has an additional possibility in terms of reducing the cross section of a path. Such a hinge also makes it possible for the restrictor to return to its initial position when the flow rate of the gas flow is reduced.

Advantageously, the regulator comprises at least one end-of-travel stop for the restrictor.

Therefore, simple means are used to ensure that the reduction of the path remains partial. Indeed, the maximum authorized movement is defined by the moment when the restrictor comes into abutment against the stop. As a result, it is possible to position the stop inside the body of the regulator in such a way that, at the end of travel, the restrictor, under the influence of the gas flow, comes to abut against the stop without reducing the cross section of the path to zero.

Advantageously, the restrictor comprises a plurality of deformable membranes, these membranes being capable of being deformed separately from each other.

This helps further optimize the regulation of the flow rate of the gas flow. Specifically, it is possible to reduce the cross section of the path in multiple locations, each corresponding to a deformation of one of the membranes, depending on the flow.

Advantageously, the device comprises an end-of-travel stop for each of the deformable membranes.

This makes it possible to limit the deformation of each of the membranes separately from each other, resulting in better regulation of the flow rate of the gas flow and therefore better ventilation of the tank.

Advantageously, the regulator comprises at least one window arranged to be traversed by the flow and that has an axis extending in a direction radial to a main axis of the regulator.

Therefore, the flow passing through the windows can be reduced, helping further improve the overall regulation of the gas flow. The regulator preferably comprises a plurality of windows.

Advantageously, the restrictor is a downstream restrictor, with reference to the flow, and the cross section is a downstream cross section, the regulator comprising an upstream restrictor arranged to increase an upstream cross section of the path when a pressure differential between a pressure upstream from the regulator and a pressure downstream from the regulator is higher than a predetermined threshold.

Therefore, when the pressure upstream from the regulator is higher than a threshold, the upstream restrictor is capable of increasing the cross section of a path in such a way as to suddenly allow the gas flow to pass through at a high flow rate. Such a regulator therefore has the advantage of limiting the risk of overpressure upstream from the regulator. The regulator also has the advantage of allowing the pressure upstream from the regulator and that downstream to be balanced, due to the reduction in the upstream cross section of the path by the upstream restrictor when the pressure differential mentioned drops back below the predetermined threshold.

Advantageously, the upstream restrictor is arranged in such a way as to prevent the gas flow from entering the regulator when the pressure differential between the pressure upstream from the regulator and the pressure downstream from the regulator is lower than the predetermined threshold.

Therefore, the regulator allows ventilation to take place over a pressure range, the minimum pressure value of which is the pressure necessary to move the upstream restrictor in such a way as to allow the gas flow to pass through the inlet of the regulator. Such a possibility of ventilating over considerable pressure ranges, for example from 35,000 to 15,000 Pascal (Pa) (from 150 to 350 Mbar), is advantageous when swift depressurization is required in order for the entire system to quickly reach atmospheric pressure.

Moreover, with this ventilation flow rate regulator, ventilation also becomes possible when a closure of the ventilation valve has occurred, for example due to a surging movement of the liquid. Indeed, after a first ventilation, the pressure differential rapidly drops below the threshold and the upstream restrictor prevents access to the path of the regulator, leaving the portion of the ventilation line situated between the ventilation valve and the regulator at the closing pressure. When the liquid surge subsides, the poppet of the ventilation valve partially opens and flow transfer is possible between the inside of the tank and the mentioned portion of the line, the pressure of which swiftly increases until it is equal to the pressure inside the tank. Advantageously, the regulator is as close as possible to the poppet of the ventilation valve, thus helping the pressure in the mentioned portion of the line to increase even more quickly until it is equal to the pressure inside the tank, due to the reduction in the volume to be pressurized in this portion of the line. This pressure balancing allows the ventilation valve to fully reopen. Ventilation is therefore possible over the whole pressure range. Below the minimum pressure value of this range, the tank must be ventilated by a second ventilation valve arranged in the ventilation line in parallel to the flow rate regulator, this second ventilation valve not running the risk of plugging in the lower pressure range. In short, a regulator provided with an upstream restrictor arranged to prevent the flow from entering below a certain pressure differential allows a plugged ventilation valve to reopen and allows the tank to be ventilated only in a high ventilation range.

Advantageously, the upstream restrictor is arranged to increase the cross section of the path from a predetermined threshold higher than the threshold from which the restrictor reduces this same cross section.

Therefore, a direct effect of the difference between these thresholds is a hysteretic change in the closing pressure of the inlet of the regulator depending on the flow rate of the incoming gas flow and the pressure differential between the pressure at the inlet and that at the outlet of the regulator. This hysteresis has the advantage of increasing the time during which ventilation is possible. This means that the time required to completely depressurize the tank is reduced.

Advantageously, the upstream restrictor comprises at least one rim arranged to reduce a cross section of the gas flow path, this cross section being situated between the upstream cross section and the downstream cross section.

Therefore, the rim arranged on the upstream restrictor allows a gas cushion to form close to the cross section of the path that is reduced by this rim. The rim is preferably arranged to convey the gas flow in such a way as to create turbulences or a gas vortex allowing a certain pressure to be maintained at the inlet of the regulator so as to prevent the regulator from being closed prematurely by the upstream restrictor. This means that continuous ventilation of the tank is possible.

Advantageously, the upstream restrictor comprises a diaphragm arranged to be stable in only two positions.

The dual stability of such a diaphragm thus helps better control the opening and closing of the regulator inlet. Specifically, when positioned in one of its stable positions, the diaphragm completely stops the gas flow from entering the regulator. Once the pressure upstream from the regulator becomes too high, the diaphragm leaves this first position and adopts its second stable position, which corresponds to the maximum opening of the inlet. The gas flow can thus follow the path which, in this location, has an unlimited cross section.

Advantageously, the diaphragm comprises at least one thinned portion forming a hinge that is stable in the two positions.

The stability of the whole diaphragm in one of its two positions is thus ensured or improved, and the switch from one position to the other is facilitated. As a result, the regulator opens and closes in response to pressures within lower pressure ranges, helping optimize its operation.

Advantageously, the diaphragm is attached to a support that is stationary with respect to the body.

The diaphragm can therefore be positioned inside the body, in the position most suitable for it to be able to perform its role of opening and closing the inlet.

Advantageously, the diaphragm delimits, with the support, a chamber in gas communication with the rest of the regulator.

Thus, when the diaphragm is in the open position and a gas flow is established between the inlet of the regulator and the outlet of the regulator, the chamber communicates with the part of the regulator where the pressure is lowest, due to the overall head loss of the regulator. This low pressure helps keep the diaphragm in the open position.

Advantageously, the diaphragm delimits, with the support, a chamber in gas communication with the outlet of the regulator.

Thus, when the diaphragm is in the stable closed position and the pressure at the inlet of the regulator reaches the opening pressure of the diaphragm, the gas contained in the chamber can escape, through a port provided in the chamber, to the outlet of the regulator. This communication between the chamber and the outlet of the regulator allows the movements of the diaphragm without needing the gas in the chamber to be compressed.

Advantageously, the two restrictors are rigidly secured together.

The actions of the two restrictors are therefore synchronized, which helps prevent the risk of one or more actions of one restrictor having a negative impact on one or more actions of the other restrictor. The assembly of the regulator is also simplified.

Alternatively, the two restrictors are mounted so as to be able to move with respect to each other.

This makes it possible to control cross sections of the same path that are separated from each other without needing to use two restrictors secured together, which may sometimes form a long component that nevertheless needs to perform different functions. Indeed, one long component forming the two restrictors becomes movable in response to pressures that are higher than those necessary in order to move shorter, separated restrictors. In the event that the regulator comprises a long body, it is easier to regulate the gas flow in different cross sections of the path with two restrictors that are able to move with respect to each other.

Advantageously, the regulator comprises, for the restrictor or at least one of the restrictors, at least one spring and/or at least one ballast weight.

Thus, when the flow rate of the gas flow causing the restrictor to move reduces, the restrictor can return to its initial position and thus restore the initial cross section of the path, i.e. the cross section of the path before this restrictor was moved.

Advantageously, the restrictor or at least one of the restrictors comprises a slider arranged to slide along the body.

This allows the modified cross section of the path to be more finely adapted depending on the movement of the slider, which depends on the force of the flow that is applied against the latter.

Advantageously, the slider is capable of closing the window or one or more of the windows when it slides along the body.

Therefore, when the slider is moved following the application of a force to the latter, resulting from the gas flow, the slider can block the ventilation window or windows arranged along the body in such a way as to reduce a cross section of the path, allowing the flow rate of the flow to be more accurately regulated. Indeed, the gradual movement of the slider allows the windows to be closed partially, and then completely, depending on the flow rate of the flow. Conversely, when the flow rate of the flow drops, the slider allows the cross section of the path to gradually increase by opening, again gradually, each of the windows previously closed by slider.

The invention also concerns a ventilation system for ventilating a pressurized vehicle tank. This ventilation system comprises at least one ventilation valve and one ventilation flow rate regulator according to the invention, the regulator being arranged downstream from at least one of the valves with reference to a gas flow flowing out of the tank.

It is therefore possible to regulate the ventilation of the tank and ensure it is completely depressurized, while preventing the ventilation valve arranged upstream from the regulator of the invention from becoming plugged.

Advantageously, the ventilation system comprises an additional ventilation valve arranged in parallel to the flow rate regulator.

Thus, when the regulator comprises an upstream restrictor closing off access to all paths when the pressure differential is lower than the predetermined threshold, it is nevertheless possible to ensure ventilation of the gas flow contained inside the tank, until the latter is completely depressurized.

The invention also concerns a pressurized vehicle tank provided with a regulator and/or a ventilation system according to the invention.

Advantageously, the tank is a fuel tank.

BRIEF DESCRIPTION OF THE SEVERAL VIEWS OF THE DRAWINGS

There now follows a presentation of different embodiments of the invention and variants given as non-limiting examples and in reference to the appended figures in which:

FIGS. 7A, 7B and 7C are schematic cross-section views of a restrictor of a regulator according to the first embodiment;

FIGS. 8 and 9 are schematic cross-section views of a regulator according to a second embodiment of the invention;

FIG. 10 is a schematic cross-section view of part of the regulator of FIGS. 8 and 9;

FIG. 11 is a schematic cross-section view of a variant of the regulator of FIGS. 8 and 9;

FIGS. 12 and 13 are schematic cross-section views of a regulator according to a third embodiment of the invention;

DETAILED DESCRIPTION OF THE INVENTION

Figure 1:
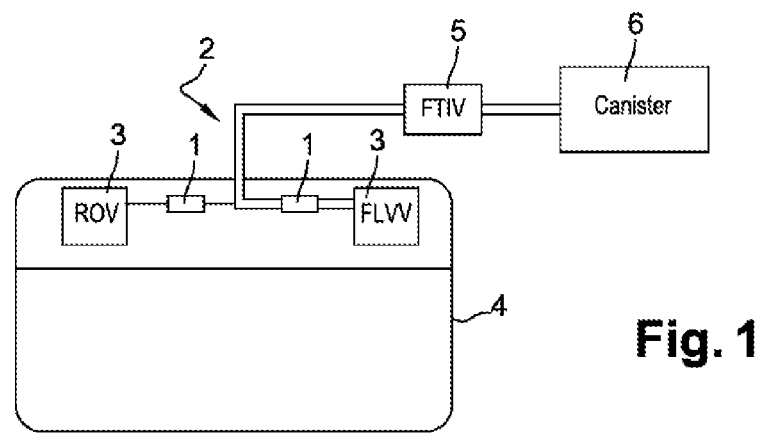
FIG. 1 is a schematic drawing of a tank equipped with a ventilation system comprising two regulators according to a first embodiment of the invention.

FIG. 1 shows, for a first embodiment of the invention, a pressurized fuel tank 4 of a hybrid vehicle comprising an electric motor and a heat engine supplied with fuel from this tank. The motor and engine are not shown.

Figure 4:
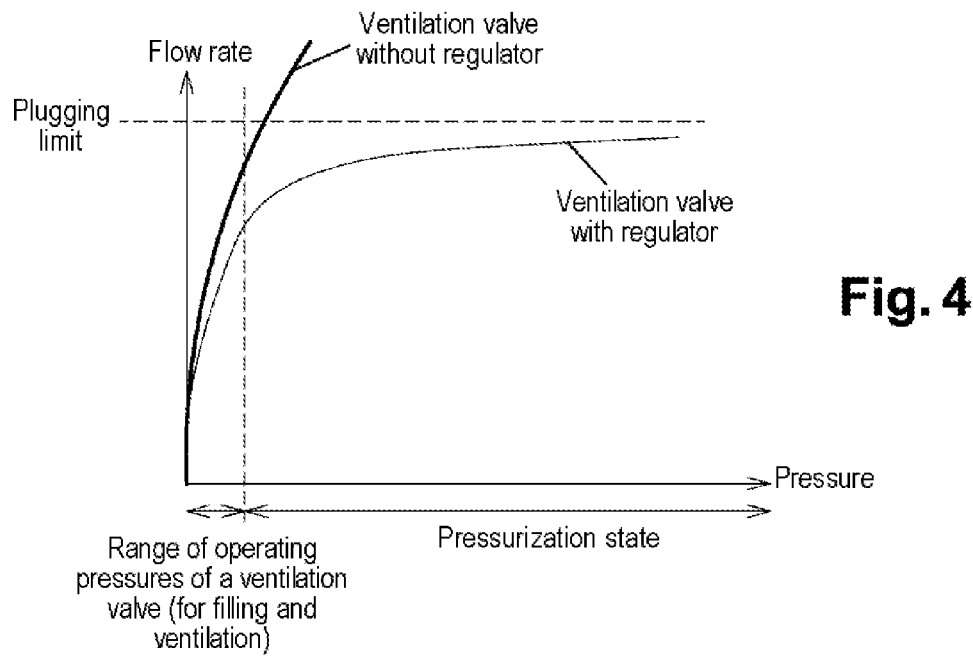
FIG. 4 is a graph showing a flow rate/pressure profile of a ventilation valve equipped or not equipped with one of the regulators of FIG. 1.

The ventilation flow rate regulator 1 according to the first embodiment of the invention is arranged, within a ventilation system 2 of this tank 4, downstream from a ventilation valve 3 of the tank 4 with reference to the direction of a gas flow flowing out of the tank 4, as shown in FIG. 1. Therefore, when an isolation valve of the tank (FTIV) 5 arranged downstream from these elements, within the ventilation system 2, generally close to a canister 6, is opened with the aim of filling the tank 4 or with the aim of switching to the heat engine mode of the hybrid vehicle (not shown), this opening is followed by a major depressurization of the tank 4. As shown in FIG. 4, the regulator 1 then allows a ventilation flow rate of the gas flow flowing out of the tank 4 to be regulated in order to prevent the ventilation poppet valve 3 from being plugged. The latter forms, in this scenario, a valve for protection in the event of the vehicle overturning (ROV) or a fill limit valve (FLVV).

Figure 2:
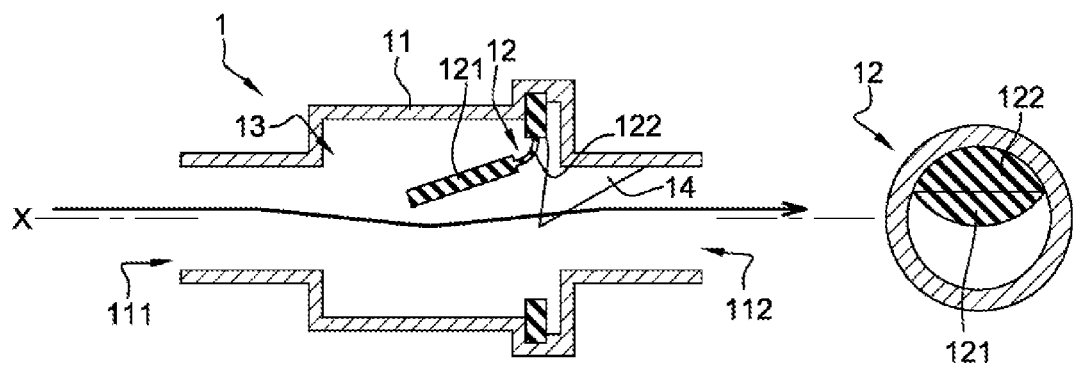
FIGS. 2 and 3 are schematic cross-section views of one of the regulators of FIG. 1.
Figure 3:
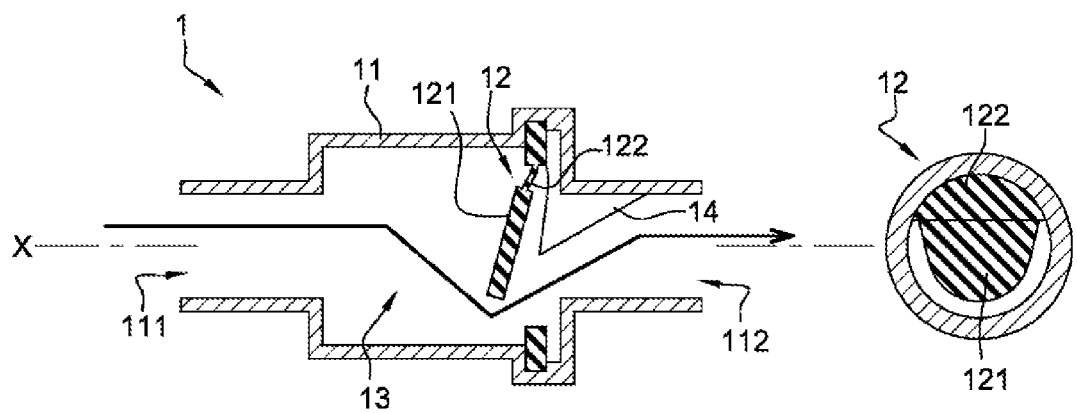

As shown in FIGS. 2 and 3, the regulator 1 comprises a body 11 having a gas inlet 111 and a gas outlet 112, and a single restrictor 12 mounted movably relative to the body 11. As shown in FIG. 2, the restrictor 12 is arranged so as to reduce a cross section of a path 13 of the gas flow proceeding from the inlet 111 to the outlet 112 when the flow rate of the flow at the inlet is higher than a predetermined threshold. In the example shown, upstream from this cross section, the path 13 is delimited by the body 11 alone. In the cross section, it is the restrictor 12 alone that delimits the path 13.

The regulator 1 comprises a stop 14 designed such that the restrictor 12 does not reduce the cross section of the path 13 to zero. Therefore, the cross section of the path 13 is never reduced to zero by the restrictor 12, which ensures ventilation takes place, whatever the flow rate of the gas flow that enters the regulator 1.

The restrictor 12 comprises a single deformable membrane 121 and also has a thinned portion 122 forming an elastic hinge hinging this membrane 121 to the body 11 on a single side of the membrane 121, the remainder of the membrane 121 being free. This thinned portion 122 is integral with the remainder of the deformable membrane 121. The restrictor 12 can consequently be deformed under the action of a gas flow having a high flow rate and can then gradually return to its initial position as the flow rate reduces. In a variant not shown here, the deformable membrane 121 and the thinned portion 122 are two separate elements assembled to each other.

In the present example, in the rest position, the position of the membrane 121 is inclined slightly or not at all with respect to a main axis X of the body 11. As the gas flow rate increases, this inclination is reduced until the membrane 121 approaches a configuration in which it is perpendicular to this axis X.

Figure 5:
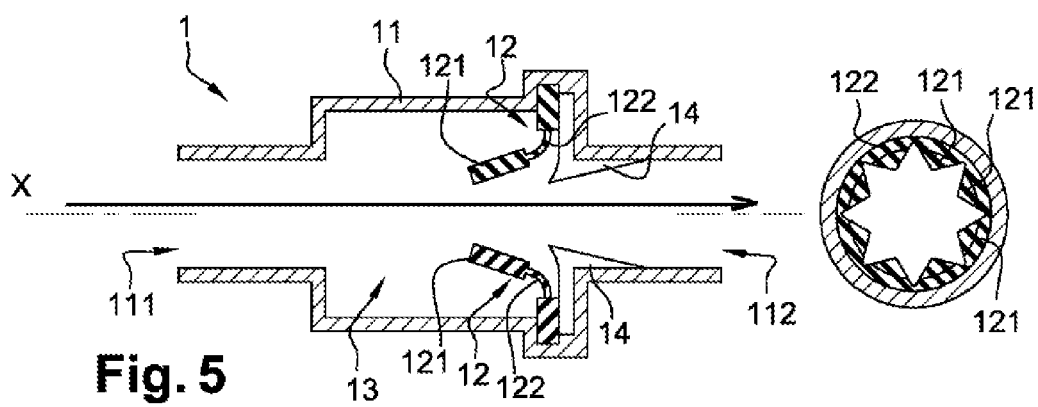
FIGS. 5 and 6 are schematic cross-section views of a variant of one of the regulators of FIG. 1.
Figure 6:
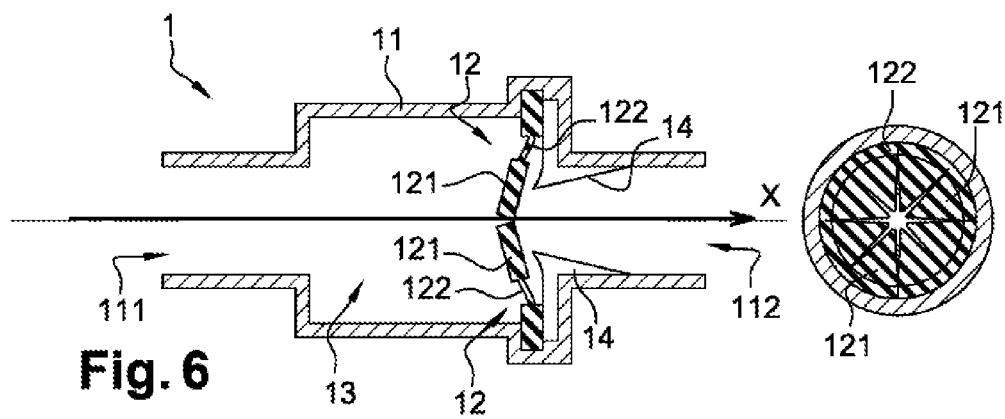

As a variant, as shown in FIGS. 5 and 6, the restrictor 12 comprises several deformable membranes 121, namely eight in the example, this number not being limiting, these deformable membranes 121 being capable of being deformed separately from each other depending on the action of the gas flow. The membranes 121 are arranged in a circle or crown around the axis X. The restrictor 12 comprises a thinned portion 122 forming a hinge and a stop 14 for each of the deformable membranes 121, which allows the latter to each be deformed separately from all the others until they come into abutment against their associated stop 14 and to return to their initial position depending on the power of the flow rate of the gas flow.

Such a deformation of a membrane 121 or one of the membranes 121 of the restrictor 12 according the first embodiment is shown in FIG. 7. In this example, the membrane 121 or one of the membranes 121 of the restrictor 12 has a variable thickness. Specifically, the thickness of this membrane 121 gradually decreases from the proximal end of the membrane 121, with reference to the thinned portion 122, to the distal end of the membrane, with reference to the thinned portion 122. First, when the flow rate of the flow is slightly higher than the predetermined threshold, the deformation of the membrane 121 is minimal, since the drag force of the flow on the membrane 121 is also minimal. Therefore, the cross section of the path 13 available for the gas flow to pass through is large, as shown in the front view associated with FIG. 7A.

FIG. 7B shows the deformation of the membrane 121 when the drag force of the flow on the membrane 121 is greater than that of FIG. 7A. This drag force increases in a non-linear manner, thus producing the inflection in the right-hand flow rate curve shown in FIG. 4. In the case in point, the narrowing of the cross section of the path 13 is ensured by the thinned portion 122 of the restrictor 12 which, under the action of the gas flow, comes into abutment against the stop 14.

Next, as shown in FIG. 7C, the lower end of the membrane 121 is deformed under the action of an even higher drag force of the gas flow, reducing still further the cross section of the path 13 through which the gas flow can pass.

Therefore, in this scenario, the membrane 121 or each membrane 121 is both deformed and moved.

As shown in FIGS. 8 to 11, the regulator 1 according to the second embodiment comprises an upstream restrictor 1013 and a downstream restrictor 1012 that are rigidly secured together. These two restrictors 1012, 1013 form a slider. This slider has an upstream wall in the form of a disk perpendicular to the axis X and a downstream cylinder. It is mounted so as to be able to slide relative to the body 11 in the direction of the axis X, in the body 11, and is returned towards the gas inlet 111 by a spring 15. The cylinder of the slider is threaded onto a male cylinder rigidly secured to the gas outlet 112 of the body 111. The latter has windows 16 or openings oriented in the direction of the axis X.

At rest, the spring 15 presses the slider such that a closed upstream planar face of the upstream wall of the slider closes the gas inlet 111.

When the pressure at the inlet 111 of the regulator 1 is less than an opening pressure, the upstream restrictor 1013 therefore prevents any gas flow from flowing along a path 13. When the pressure increases sufficiently at the inlet of the regulator, in such a way that the pushing force of the flow applied to the slider is greater than the force exerted by the spring 15 on the slider, the slider slides along the body 11. The gas flow can then take the single peripheral path 13 of the body 11, by passing around the upstream wall. The sliding of the slider along the body 11 causes the access to some of the ventilation windows 16 arranged close to the outlet 112 of the body 11 to be closed, in such a way as to direct the flow. This closing has the effect of reducing the cross section of the path 13 available at the outlet of the body 11, making it possible to regulate the flow rate of the gas flow in the ventilation system 2 so as to prevent it from exceeding the plugging limit of the ventilation valve 3. This is the downstream restrictor 1012 function also fulfilled by the slider.

After the opening of the inlet 111 of the regulator 1, accompanied by the compressing of the spring 15, a phenomenon of repeated opening/closing of the inlet 111 of the regulator 1 by the upstream restrictor 1013 can result, due to the fact that the return force of the spring 15 increases as it compresses. In order to prevent such a phenomenon from occurring after the opening of the latter, the upstream restrictor 1013 comprises, around the circumference of the upstream wall, a cylindrical circular rim 10131 turned towards the gas inlet 111. It is arranged to reduce an intermediate cross section of the gas flow path 13 situated between the cross section of the path 13 at the inlet 111 and the cross section reduced by the downstream restrictor 1012 close to the outlet 112 of the regulator 1. In this way, as shown in FIG. 10, the rim 10131 creates a gas flow vortex acting as a gas cushion and helping compensate for the return force of the spring 15, helping provide more sustained access to the gas flow path 13. In order to limit this return force as far as possible, it is preferable to use a spring 15 that is as long as possible.

As a variant of this embodiment, as shown in FIG. 11, the spring 15 can be replaced with at least one ballast weight 17, carried by the slider, for example externally, where its wall meets its cylinder. For this purpose, the regulator 1 must be mounted with its axis X vertical in the ventilation system 2 in order for the ballast weight 17 to perform both the function of compensating for the pushing force of the incoming flow and also the function of closing the inlet 111 of the regulator 1 below a certain pressure. The advantage of this variant is that the return force of the ballast weight 17 does not increase with the movement of the slider, because it is constant. Indeed, this force depends purely on the mass of the ballast weight 17 and the force of gravity, both of which are constant values. This means that it is easier to keep the inlet 111 of the regulator 1 open for longer.

Figure 13:
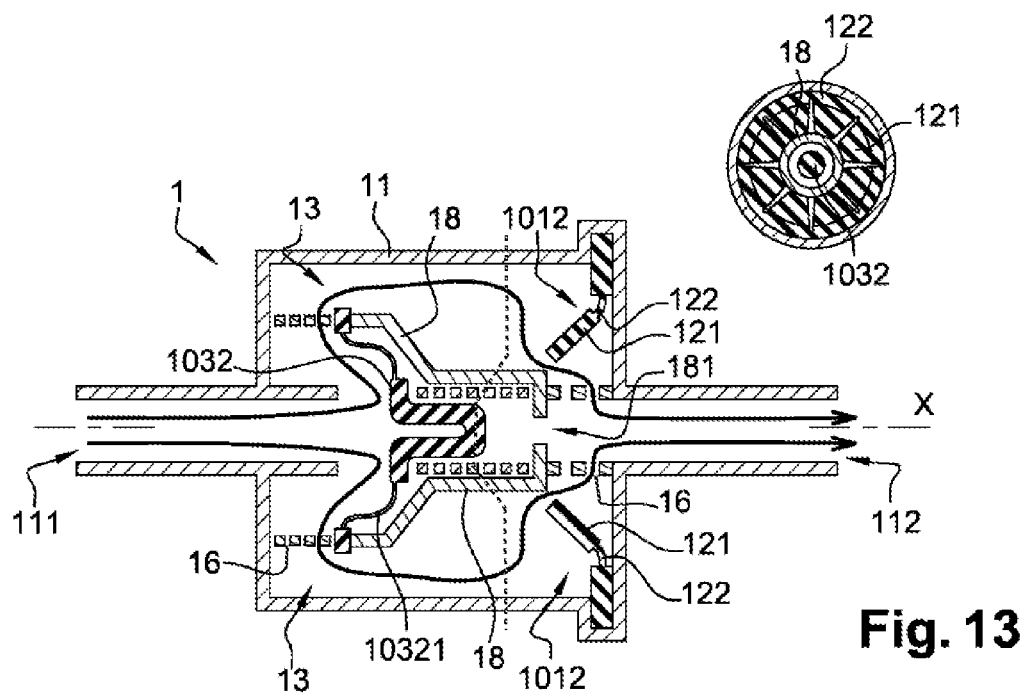
Figure 14:
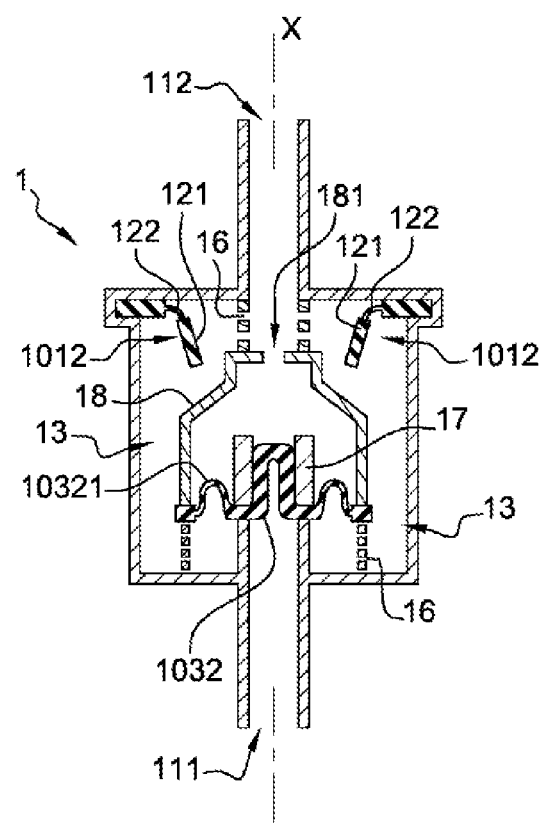
FIG. 14 is a schematic cross-section view of a variant of the regulator of FIGS. 12 and 13.

As shown in FIGS. 12 to 14, the regulator 1 according to the third embodiment comprises an upstream restrictor 1013 and a downstream restrictor 1012 that are mounted so as to be able to move relative to each other.

The downstream restrictor 1012 corresponds to the restrictor 12 described in FIGS. 5 and 6.

The upstream restrictor 1013 comprises a diaphragm 1032 that is stable in two positions, a closed position, as shown in FIGS. 12 and 14, and a maximum open position, as shown in FIG. 13. For this purpose, the diaphragm 1032 is attached to a support 18 that is stationary with respect to the body 11, and arranged inside the body 11. The support 18 has a flared shape, having a frustoconical intermediate portion, and is arranged to allow the diaphragm 1032 to be attached to the periphery of the upstream end of same. The shape of the diaphragm 1032 is rotationally symmetrical about the axis X and comprises a thinned peripheral portion 10321, linked to the support 18 and forming a hinge that is stable in the two positions.

The diaphragm 1032 forms, with the stationary support 18, a chamber, inside which a spring 15 is arranged that bears, along the axis X, on the one hand on the diaphragm 1032, in the direction of the gas inlet 111, and on the other hand on the support 18, in the direction of the gas outlet 112. The stationary support 18 has an axial port 181 at the outlet 112 side of the body 11, which allows the pressure inside the chamber to be regulated. This regulation facilitates the switching of the diaphragm 1032 from one position to another. In this example, ventilation windows 16 are arranged close to the inlet 111 and the outlet 112 so as to direct the flow over a larger portion of the path 13. Therefore, a regulator according to the last two embodiments functions as follows when the pressure downstream from the regulator is constant, generally being atmospheric pressure. When gas accumulates upstream from the regulator 1, because it is prevented from entering the body by the upstream restrictor 1013, the pressure upstream from the regulator increases until it reaches, then exceeds, the opening pressure. As a result, the upstream restrictor 1013 is moved under the influence of the gas flow, allowing the latter to access the path 13. The further the upstream restrictor 1013 is moved, the larger the cross section of the path 13 at the inlet 111 of the regulator 1. Therefore, the gas flow takes the path 13 which has variable cross sections, due, for example, to the positioning of windows 16 and/or to the presence of the rim 1013, until it arrives at the downstream cross section of the path 13, controlled by the downstream restrictor 1012. When the flow rate reduces, because there is sufficient ventilation to allow depressurization of the tank 4, the upstream restrictor 1013 can gradually return to its initial position under the return effect of the spring, and can, therefore, gradually reduce the cross section of the path 13 at the inlet 111, until this cross section is reduced to zero, once more blocking off the inlet 111 to the gas flow.

FIG. 14 shows a variant of this embodiment in which the spring 15 is replaced by a ballast weight 17. In this instance, the ballast weight 17 bears on the diaphragm 1032, inside the chamber that it delimits with its support 18. This variant has the same advantages as those mentioned for the variant of the second embodiment shown in FIG. 11.

Figure 15:
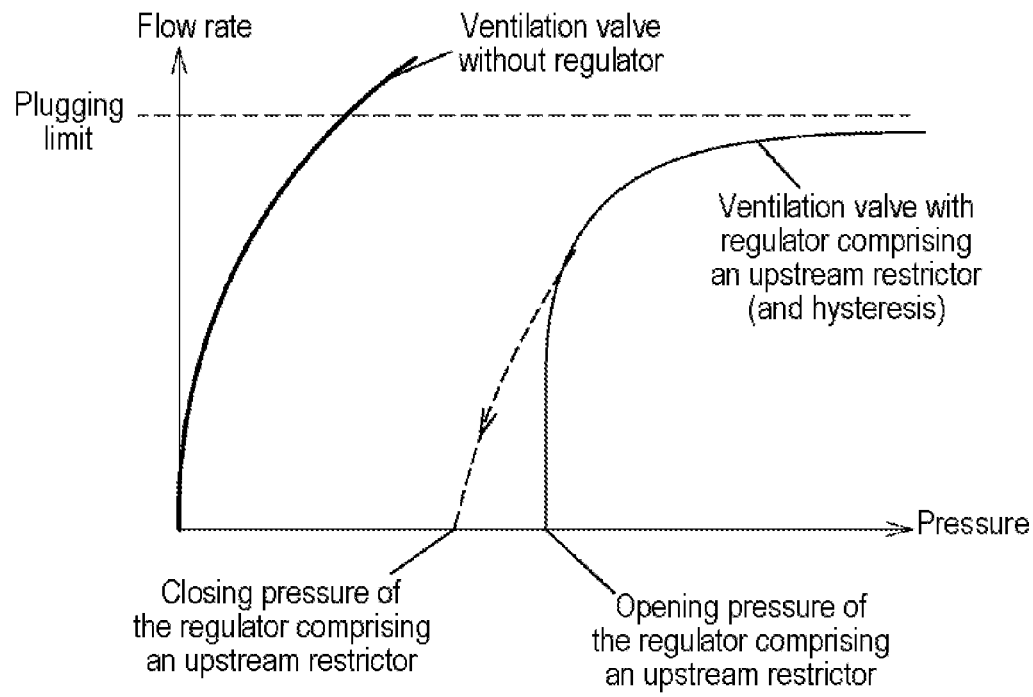
FIG. 15 is a graph showing a flow rate/pressure profile of a ventilation valve equipped or not equipped with a regulator according to the second or third embodiment of the invention.

FIG. 15 shows a graph displaying a ventilation flow rate curve of a valve without a regulator and a ventilation flow rate curve of a valve provided with a regulator 1 according to the second or third embodiment of the invention. It can be seen that, when a ventilation valve 3 is arranged inside the ventilation system 2 with this type of regulator 1 downstream, ventilation is ensured by this ventilation valve 3 over a range of high pressures, for example from 35,000 to 15,000 Pascal (Pa) (from 350 to 150 Mbar). It is noted that the pressure at which ventilation can begin, in this example 15,000 Pa, is higher than that from which ventilation stops as a result of the specific arrangement of the upstream restrictor 1013. This hysteresis, which is shown by the part of the curve represented as a dotted line, helps increase the time during which the ventilation valve 3 ventilates, thus reducing the time required to completely depressurize the tank 4.

Figure 16:
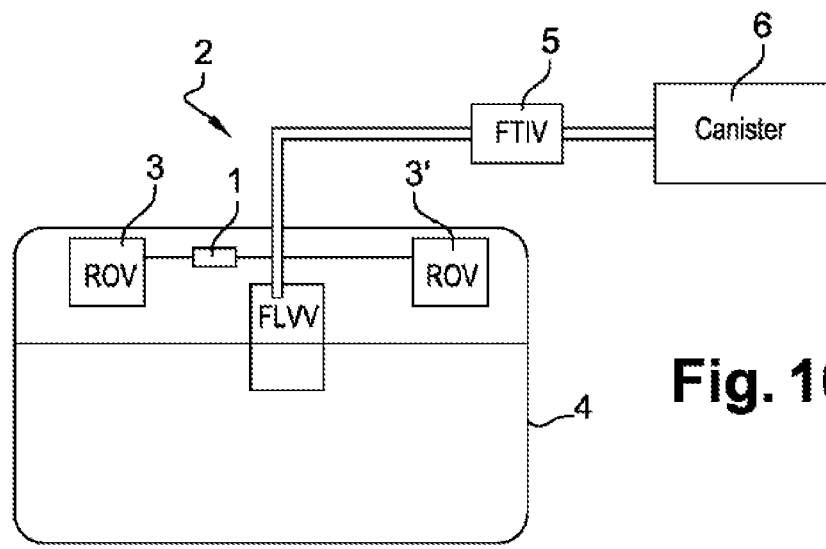
FIG. 16 is a schematic drawing of a tank equipped with a ventilation system incorporating a regulator according to the second or third embodiment of the invention.

As shown in FIG. 16, which shows a tank 4 the same as that of FIG. 1, such a regulator 1 is mounted inside the ventilation system 2, preferably downstream from a valve for protection in the event of the vehicle overturning (ROV) and thus allows the poppet of this valve 3 to reopen in the event of this valve 3 being plugged following a surging movement of the liquid contained in the tank 4.

In such a situation, the ventilation of the gas contained in the tank takes place as follows.

The internal volume of the tank 4, and the portions of line P1 and P2 of the ventilation system 2 are at identical pressures, i.e. 35,000 Pa, when the valve 3 is plugged as a result of the abovementioned surge, as shown in FIG. 16.

Thus, when the opening of the isolation valve of the tank (FTIV) is triggered, the portion P2 very quickly passes to atmospheric pressure because of the fluid communication between the ventilation system 2 and the outside of the system. Consequently, the pressure differential between P1 and P2 causes the upstream restrictor 1013 of the regulator 1 to move for a very short period necessary for the depressurization of the portion P1, which passes from 35,000 Pa to a little under 15,000 Pa, at which pressure the upstream restrictor 1013 closes the inlet 111 of the regulator 1.

When the surging movement stops, the poppet of the valve 3 opens partially as a result of the pressure difference between the tank and the portion P1. As a result of its reduced volume, the portion P1 increases very quickly in pressure to 35,000 Pa, allowing the poppet of the ventilation valve 3 to fully open again. The tank 4 and the portion P1 can then be ventilated until the closing pressure of the regulator 1 is reached, i.e. a little under 15,000 Pa.

The continuation of the ventilation is ensured by a second ventilation valve 3' arranged in parallel to the regulator 1.

The invention is not limited to the disclosed embodiments, and other embodiments will be clearly apparent to a person skilled in the art. In particular, in one possible embodiment of the invention, the regulator comprises both a spring and a ballast weight. In another possible embodiment of the invention, the ventilation system comprises at least two ventilation valves mounted in parallel, these two ventilation valves both being regulated by a single regulator arranged downstream from the two valves with reference to a gas flow flowing out of the tank.

The invention claimed is:

1. A ventilation flow rate regulator for a pressurized tank of a vehicle, comprising:
a body including a gas inlet and a gas outlet;
an upstream restrictor which increases a flow rate of an upstream portion of a path of a gas flow proceeding from the inlet to the outlet when a pressure differential between a pressure upstream from the regulator and a pressure downstream from the regulator is higher than a predetermined threshold; and
a downstream restrictor which moves relative to the body to reduce the flow rate of a downstream portion of the path, when a flow rate at the inlet is greater than a predetermined threshold,
the regulator configured so that the flow rate of said downstream portion of the path remains non-zero,
wherein the upstream restrictor comprises a diaphragm configured to be stable in only two positions,
wherein the diaphragm is attached to a support that is stationary with respect to the body, the support being separate from the body and presenting a flared shape having a frustoconical portion, and the diaphragm including a thinned peripheral portion that is attached to an upstream end of the support, and
wherein the diaphragm delimits, with the support, a chamber in gas communication with the outlet, and a biasing element is provided inside the chamber, a first end of the biasing element abutting the diaphragm and a second end of the biasing element abutting the support.

2. The regulator as claimed in claim 1, wherein the downstream restrictor comprises at least one thinned portion forming a hinge.

3. The regulator as claimed in claim 1, wherein the downstream restrictor comprises a plurality of deformable membranes, the membranes configured to be deformed separately from each other.

4. The regulator as claimed in claim 1, wherein the upstream and downstream restrictors are mounted to move with respect to each other.

5. The regulator as claimed in claim 1, further comprising a ballast weight provided on the upstream restrictor.

6. The regulator as claimed in claim 1, wherein the downstream restrictor comprises a deformable membrane.

7. The regulator as claimed in claim 6, wherein the deformable membrane has a first thickness, at a first cross section of the deformable membrane, and a second thickness, at a second cross section of the deformable membrane, the first thickness and the second thickness being different.

8. The regulator as claimed in claim 1, further comprising a plurality of windows configured to be traversed by the flow and including an axis extending in a direction radial to a main axis of the regulator.

9. The regulator as claimed in claim 8, wherein the plurality of windows is disposed on the support.

10. A ventilation system for ventilating a pressurized vehicle tank, comprising:
a ventilation valve and a ventilation flow rate regulator as claimed in claim 1, the ventilation flow rate regulator being arranged downstream from the ventilation valve with reference to a gas flow flowing out of the tank.

11. The ventilation system as claimed in claim 10, further comprising an additional ventilation valve arranged in parallel to the flow rate regulator.

12. A pressurized vehicle tank, comprising:
a ventilation flow rate regulator comprising
a body including a gas inlet and a gas outlet;
an upstream restrictor which increases a flow rate of an upstream portion of a path of a gas flow proceeding from the inlet to the outlet when a pressure differential between a pressure upstream from the regulator and a pressure downstream from the regulator is higher than a predetermined threshold; and a downstream restrictor which moves relative to the body to reduce the flow rate of a downstream portion of the path, when a flow rate at the inlet is greater than a predetermined threshold, the ventilation flow rate regulator configured so that the flow rate of said downstream portion of the path remains non-zero, wherein the upstream restrictor comprises a diaphragm configured to be stable in only two positions, wherein the diaphragm is attached to a support that is stationary with respect to the body, the support being separate from the body and presenting a flared shape having a frustoconical portion, and the diaphragm including a thinned peripheral portion that is attached to an upstream end of the support, and wherein the diaphragm delimits, with the support, a chamber in gas communication with the outlet, and a biasing element is provided inside the chamber, a first end of the biasing element abutting the diaphragm and a second end of the biasing element abutting the support.

13. The tank as claimed in claim 12, wherein the tank is a fuel tank.

* * * * *